(12) United States Patent
Lee et al.

(10) Patent No.: US 10,535,873 B2
(45) Date of Patent: Jan. 14, 2020

(54) POSITIVE ELECTRODE ACTIVE MATERIAL FOR SECONDARY BATTERY, METHOD OF PREPARING THE SAME AND SECONDARY BATTERY INCLUDING THE SAME

(71) Applicant: LG Chem, Ltd., Seoul (KR)

(72) Inventors: Sang Wook Lee, Daejeon (KR); Wang Mo Jung, Daejeon (KR); Byung Chun Park, Daejeon (KR); Ju Kyung Shin, Daejeon (KR); Sang Min Park, Daejeon (KR); Min Suk Kang, Daejeon (KR)

(73) Assignee: LG Chem, Ltd. (KR)

( * ) Notice: Subject to any disclaimer, the term of this patent is extended or adjusted under 35 U.S.C. 154(b) by 214 days.

(21) Appl. No.: 15/743,916

(22) PCT Filed: Mar. 3, 2017

(86) PCT No.: PCT/KR2017/002357
§ 371 (c)(1),
(2) Date: Jan. 11, 2018

(87) PCT Pub. No.: WO2017/150949
PCT Pub. Date: Sep. 8, 2017

(65) Prior Publication Data
US 2018/0212237 A1    Jul. 26, 2018

(30) Foreign Application Priority Data

Mar. 4, 2016  (KR) .................. 10-2016-0026224
Mar. 3, 2017  (KR) .................. 10-2017-0027879

(51) Int. Cl.
*H01M 4/36*      (2006.01)
*H01M 4/525*     (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 9,559,351 B2   1/2017  Mori et al.
9,660,291 B2   5/2017  Kim et al.
(Continued)

FOREIGN PATENT DOCUMENTS

EP      2963706 A1    1/2016
JP      2009087891 A  4/2009
(Continued)

OTHER PUBLICATIONS

Search report from International Application No. PCT/KR2017/002357, dated Jun. 1, 2017.
(Continued)

*Primary Examiner* — Jeremiah R Smith
(74) *Attorney, Agent, or Firm* — Lerner, David, Littenberg, Krumholz & Mentlik, LLP

(57) ABSTRACT

The present invention provides a positive electrode active material for a secondary battery and a secondary battery including the same, which includes a core; a shell located to surround the core; and a buffer layer located between the core and the shell, and including a three-dimensional network structure connecting the core and the shell and a pore. The decomposition of the active material may be minimized by a rolling process in the manufacture of an electrode by controlling the specific surface area, average particle diameter and porosity of the active material particles as well as the specific structure, the reactivity with an electrolyte (Continued)

solution may be maximized, and the output and lifespan characteristics of the secondary battery may be improved since the particles forming the shell have crystal structure with orientation which facilitates intercalation and deintercalation of lithium ions.

20 Claims, 1 Drawing Sheet

(51) Int. Cl.
    *H01M 10/0525*     (2010.01)
    *H01M 4/505*     (2010.01)
    *H01M 4/02*     (2006.01)
    *H01M 4/131*     (2010.01)
    *C01G 53/00*     (2006.01)

(52) U.S. Cl.
    CPC ...... *H01M 10/0525* (2013.01); *C01G 53/006* (2013.01); *C01G 53/50* (2013.01); *H01M 4/131* (2013.01); *H01M 4/36* (2013.01); *H01M 2004/021* (2013.01); *H01M 2004/028* (2013.01)

(56) References Cited

U.S. PATENT DOCUMENTS

| | | | |
|---|---|---|---|
| 2004/0200998 A1 | 10/2004 | Park et al. | |
| 2013/0149608 A1 | 6/2013 | Kim et al. | |
| 2013/0202966 A1 | 8/2013 | Yu et al. | |
| 2013/0337331 A1 | 12/2013 | Mori et al. | |
| 2013/0344391 A1* | 12/2013 | Yushin | H01M 4/366 |
| | | | 429/231.8 |
| 2014/0057179 A1* | 2/2014 | Yushin | H01M 4/364 |
| | | | 429/238 |
| 2014/0158932 A1 | 6/2014 | Sun et al. | |
| 2014/0170493 A1* | 6/2014 | Holme | H01M 4/04 |
| | | | 429/220 |
| 2014/0205901 A1 | 7/2014 | Nagai et al. | |
| 2014/0335417 A1* | 11/2014 | Nagai | H01M 4/131 |
| | | | 429/231.1 |
| 2015/0180026 A1 | 6/2015 | Shimokita | |
| 2015/0318530 A1* | 11/2015 | Yushin | H01M 4/628 |
| | | | 429/131 |
| 2016/0013471 A1 | 1/2016 | Kaseda et al. | |
| 2016/0190573 A1 | 6/2016 | Sun et al. | |
| 2017/0018768 A1* | 1/2017 | Yushin | H01M 4/582 |
| 2018/0083263 A1* | 3/2018 | Cho | H01M 4/134 |
| 2018/0241031 A1* | 8/2018 | Pan | H01M 4/364 |
| 2019/0074508 A1* | 3/2019 | Ha | H01M 4/366 |

FOREIGN PATENT DOCUMENTS

| | | |
|---|---|---|
| JP | 2013051172 A | 3/2013 |
| JP | 2013120752 A | 6/2013 |
| JP | 2014026990 A | 2/2014 |
| JP | 2015076336 A | 4/2015 |
| JP | 2015144119 A | 8/2015 |
| KR | 20030083476 A | 10/2003 |
| KR | 20090082790 A | 7/2009 |
| KR | 20110083383 A | 7/2011 |
| KR | 20130138147 A | 12/2013 |
| KR | 20150121009 A | 10/2015 |
| WO | 2012131779 A1 | 10/2012 |
| WO | 2015016647 A1 | 2/2015 |
| WO | 2015108163 A1 | 7/2015 |
| WO | 2016204563 A1 | 12/2016 |

OTHER PUBLICATIONS

Extended European Search Report for Application No. EP17760353.7 dated Feb. 11, 2019.

Jang-Yeon Hwang et al., "Radially aligned hierarchical columnar structure as a cathode material for high energy density sodium-ion batteries", Nature Communications, vol. 6, No. 1, Apr. 17, 2015, pp. 1-9, XP055446508.

* cited by examiner

[FIG. 1]
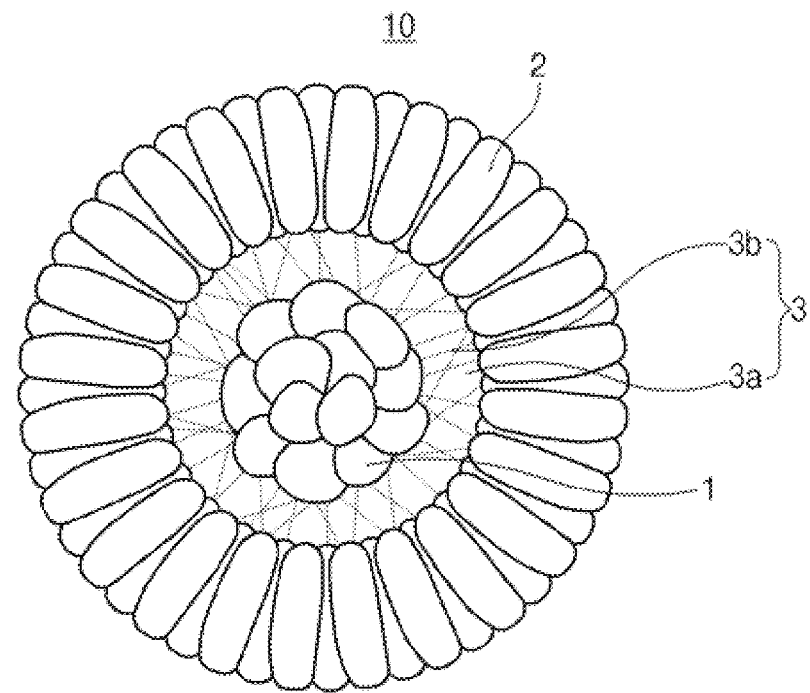
[FIG. 2]
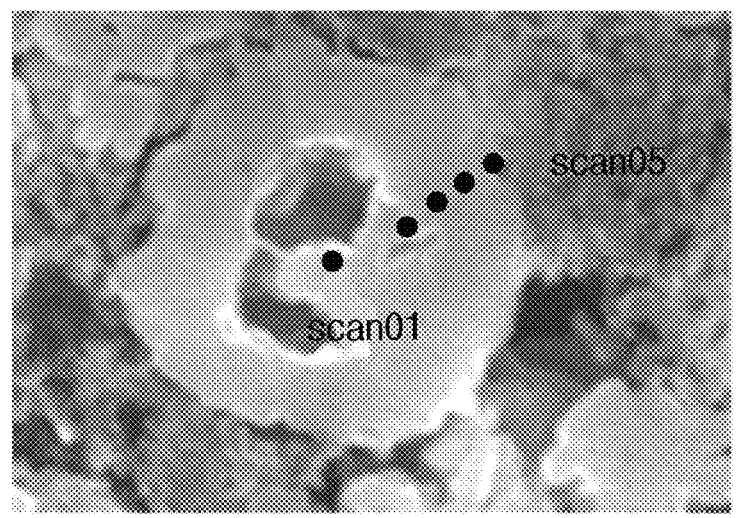

POSITIVE ELECTRODE ACTIVE MATERIAL FOR SECONDARY BATTERY, METHOD OF PREPARING THE SAME AND SECONDARY BATTERY INCLUDING THE SAME

TECHNICAL FIELD

Cross-Reference to Related Applications

The present application is a national phase entry under 35 U.S.C. § 371 of International Application No. PCT/KR2017/002357, filed on Mar. 3, 2017, which claims priority from Korean Patent Application No. 10-2016-0026224, filed on Mar. 4, 2016 and Korean Patent Application No. 10-2017-0027879, filed on Mar. 3, 2017, the disclosures of which are incorporated herein by reference in their entirety.

Technical Field

The present invention relates to a positive electrode active material for a secondary battery which can improve a charge/discharge characteristic of a battery, a method of preparing the same, and a secondary battery including the same.

BACKGROUND ART

According to the technical development and increased demand for mobile devices, the demand for secondary batteries as an energy source is dramatically increasing. Among these secondary batteries, a lithium secondary battery which has higher energy density and voltage, a longer cycle life and a lower self-discharge rate has been commercialized and widely used.

However, a lithium secondary battery has the drawback of a drastic decrease in lifespan because of repeated charging/discharging. Particularly, such a problem becomes more serious at a high temperature. This is because an electrolyte is degraded or active materials are deteriorated due to moisture in the battery or other reasons, and the internal resistance of the battery is increased.

Therefore, currently, the most actively developed and used positive electrode active material for a lithium secondary battery is layered $LiCoO_2$. While $LiCoO_2$ is most widely used because of excellent characteristics of a lifespan and charge/discharge efficiency, due to low structural stability, it has a limitation to be applied to technology for making a high capacity battery.

As a positive electrode active material for replacing the conventional material, various lithium composite metal oxides such as $LiNiO_2$, $LiMnO_2$, $LiMn_2O_4$, $LiFePO_4$, $Li(Ni_xCo_yMn_z)O_2$, etc. have been developed. Among these, $LiNiO_2$ has a battery characteristic of high discharge capacity as an advantageous effect, but it is difficult to be synthesized by a simple solid-phase reaction and has low thermal stability and cycle characteristic as adverse effects. In addition, while a lithium manganese-based oxide such as $LiMnO_2$ or $LiMn_2O_4$ has excellent thermal stability and a cheap price as advantageous effects, it has a low capacity and a poor high temperature characteristic as adverse effects. Particularly, $LiMn_2O_4$ is commercialized as some of low-price products, but does not have a good lifespan characteristic because of structural deformation (Jahn-Teller distortion) caused by $Mn^{3+}$. Moreover, $LiFePO_4$ has a low price and excellent stability and thus is recently used in various studies for hybrid electric vehicles (HEVs), but it is difficult to be used for other applications because of low conductivity.

Due to the above-mentioned reasons, recently, the most highly appreciable material as an alternate positive electrode active material for $LiCoO_2$ is a lithium nickel-manganese-cobalt oxide, $Li(Ni_xCo_yMn_z)O_2$ (where each of the x, y, and z is an atomic fraction of an independent oxide composition element, $0<x\leq1$, $0<y\leq1$, $0<z\leq1$, and $0<x+y+z\leq1$). This material has a lower price than $LiCoO_2$ and the use in high capacity and high voltage as advantageous effects, but has low rate capability and a low lifespan characteristic at a high temperature as adverse effects.

Therefore, there is an eager demand for a method of preparing a positive electrode active material that can improve performance of a lithium secondary battery by the change of the composition in a lithium composite metal oxide or the control of a crystal structure therein.

DISCLOSURE

Technical Problem

To overcome the above-mentioned problems, the present invention is first directed to providing a positive electrode active material for a secondary battery, which can improve the charge/discharge characteristic of a battery, and a method of preparing the same.

The present invention is secondly directed to providing a positive electrode, a lithium secondary battery, a battery module and a battery pack, which include the positive electrode active material.

Technical Solution

In one aspect, the present invention provides a positive electrode active material for a secondary battery, which includes: a core; a shell located to surround the core; and a buffer layer which is located between the core and the shell and includes a three-dimensional network structure connecting the core and the shell and a pore, wherein the core, the shell and the three-dimensional network structure in the buffer layer each independently include a lithium composite metal oxide, and the positive electrode active material has a BET specific surface area of 0.2 m²/g to 0.5 m²/g, a porosity of 30 vol % or less, and an average particle size ($D_{50}$) of 8 μm to 15 μm.

In another aspect, the present invention provides a method of preparing the above-described positive electrode active material for a secondary battery, which includes: preparing a reaction solution in which a seed of a metal-containing hydroxide or oxyhydroxide is generated by adding an ammonium cation-containing complexing agent and a basic compound to a metal raw material mixture including a nickel raw material, a cobalt raw material and an M1 raw material (here, M1 is at least any one element selected from the group consisting of Al and Mn) to induce coprecipitation at pH 11 to 13; growing the metal-containing hydroxide or oxyhydroxide particles by adding an ammonium cation-containing complexing agent and a basic compound to the reaction solution until the reaction solution reaches pH 8 or more and less than pH 11; and mixing the grown metal-containing hydroxide or oxyhydroxide particles with a lithium raw material and an M3 raw material (here, M3 is one or two or more elements selected from the group consisting of W, Mo and Cr) and then thermally treating the resulting mixture.

In still another aspect, the present invention provides a positive electrode for a secondary battery, a lithium secondary battery, a battery module and a battery pack, which include the above-described positive electrode active material.

Other details of other exemplary embodiments of the present invention are included in the detailed description below.

Advantageous Effects

According to the present invention, since a positive electrode active material for a secondary battery has a specific structure in which a particle includes a core-shell structure and further includes a buffer layer of a lithium composite metal oxide in a network structure to connect the core and the shell, which is located between the core and shell, and the specific surface area, average particle diameter and porosity of the active material particles are controlled together, decomposition of the active material caused by a rolling process in manufacture of an electrode can be minimized, and the reactivity with an electrolyte solution can be maximized, and due to a crystal structure of the particles forming the shell with an orientation that facilitates intercalation and deintercalation of lithium ions, the output and lifespan characteristics of a secondary battery can be improved. Therefore, the positive electrode active material according to the present invention is useful as a positive electrode active material for a battery requiring high capacity, a long lifespan and thermal stability, such as a battery for an automobile or an electrical tool, and particularly, a battery requiring minimization in performance deterioration at a high voltage such as an automobile battery.

DESCRIPTION OF DRAWINGS

The accompanying drawings attached to the specification illustrate exemplary embodiments of the present invention, and are provided to help in further understanding the technical idea of the present invention, together with the description of the scope of the present invention mentioned above, and therefore, it should not be construed as limited to only the matter shown in the drawings.

FIG. 1 is a cross-sectional view schematically showing the structure of a positive electrode active material for a secondary battery according to an exemplary embodiment of the present invention.

FIG. 2 is an image of a positive electrode active material prepared in Example 1, taken by a field emission scanning electron microscopy (FE-SEM; observation magnification=30000×).

MODES OF THE INVENTION

Hereinafter, the present invention will be described in further detail to help in understanding the present invention.

The terms and words used herein and in the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

A positive electrode active material for a secondary battery according to an exemplary embodiment of the present invention includes a core;
a shell surrounding the core; and
a buffer layer which is located between the core and shell, and includes a three-dimensional network structure connecting the core and the shell and a pore, wherein the core, the shell and the three-dimensional network structure in the buffer layer each independently include a lithium composite metal oxide, and the positive electrode active material has a BET specific surface area of 0.2 $m^2/g$ to 0.5 $m^2/g$, a porosity of 30 vol % or less, and an average particle size ($D_{50}$) of 8 μm to 15 μm.

As such, since the positive electrode active material for a secondary battery according to an exemplary embodiment of the present invention has a particle structure having a core-shell structure, in which a buffer layer formed in a three-dimensional network structure connecting the core and the shell is further formed between the core and shell, thereby minimizing the decomposition of the active material by a rolling process in the manufacture of an electrode and maximizing the reactivity with an electrolyte solution, and may improve the output and lifespan characteristics of a secondary battery since the particles forming the shell have a crystal structure with an orientation facilitating the intercalation and deintercalation of lithium ions. In addition, the positive electrode active material may further improve a charge/discharge characteristic when applied to a battery by controlling the specific surface area, average particle diameter and porosity of the particles together.

FIG. 1 is a cross-sectional view schematically showing the structure of a positive electrode active material for a secondary battery according to an exemplary embodiment of the present invention. FIG. 1 is merely an example for illustrating the present invention, but the present invention is not limited thereto.

Referring to FIG. 1, a positive electrode active material for a secondary battery 10 according to an exemplary embodiment of the present invention includes a core 1, a shell 2 located to surround the core, and a buffer layer 3 located between a core and a shell to surround the core, wherein the buffer layer 3 includes a pore 3a and a three-dimensional network structure 3b.

Specifically, in the positive electrode active material 10, the core 1 includes a lithium composite metal oxide (hereinafter, simply referred to as a "first lithium composite metal oxide") as a reversible lithium intercalation and deintercalation-available compound (lithiated intercalation compound).

The core 1 may consist of single particles of the first lithium composite metal oxide, or consist of secondary particles in which primary particles of the first lithium composite metal oxide agglomerate. Here, the primary particles may be uniform or non-uniform.

In addition, in the positive electrode active material 10, the shell 2 includes a lithium composite metal oxide (hereinafter, simply referred to as a "second lithium composite metal oxide") as a reversible lithium intercalation and deintercalation-available compound (lithiated intercalation compound).

The second lithium composite metal oxide may be crystal-oriented particles radially grown from the center to the outside of the positive electrode active material. As such, since the particles of the second lithium composite metal oxide forming the shell have a crystal orientation in a direction to facilitate the intercalation and deintercalation of lithium ions, a higher output characteristic may be implemented than that of particles having the same composition but not having crystal orientation.

Specifically, in the shell 2, the particles of the second lithium composite metal oxide may have various forms, for example, polygonal shapes including a hexahedral shape, cylindrical, fiber-shaped or scaly shape. More specifically, the particles of the second lithium composite metal oxide may be formed in a fiber-shaped shape having an aspect ratio of 1.5 or more. When the aspect ratio of particles of the second lithium composite metal oxide forming the shell is less than 1.5, uniform particle growth does not occur, and thus an electrochemical characteristic may be degraded. Here, the aspect ratio refers to a ratio of a length of the short axis direction perpendicular to the long axis through the center of the oxide particle with respect to the length of the long axis direction passing through the center of the second lithium composite metal oxide particle.

In addition, the shell 2 may further include a pore formed between the particles of the second lithium composite metal oxide.

Meanwhile, between the core 1 and the shell 2, a buffer layer 3 including a pore 3a and a three-dimensional network structure 3b connecting the core and the shell is located.

In the buffer layer 3, the pore 3a is formed in the conversion of active material particles into a hollow-form structure by controlling pH of a reactant during preparation of the active material, thereby creating a space between the core 1 and the shell 2 to be a buffer in rolling for manufacturing an electrode. In addition, the pore 3a may allow an electrolyte solution to easily permeate into the positive electrode active material and to react with the core, and thereby a reaction area of the active material with the electrolyte solution may be increased.

As described above, in addition to the pore 3a formed in the buffer layer, a pore which may be formed between the lithium composite metal oxide particles included in the shell may be selectively added. The positive electrode active material may have a porosity of particularly 30 vol % or less and more particularly 2 vol % to 30 vol %, with respect to a total volume of the positive electrode active material. Within the above range of porosity, the positive electrode active material may have an excellent buffer action without a decrease in mechanical strength of the active material and an increased reaction area with the electrolyte solution. In addition, in consideration of a significantly improved effect according to the pore formation, the positive electrode active material may have a porosity of 5 vol % to 25 vol % with respect to a total volume of the positive electrode active material. Here, the porosity of the positive electrode active material may be measured by cross-section analysis of particles using a focused ion beam (FIB) or mercury intrusion.

In addition, in the buffer layer 3, the three-dimensional network structure 3b is formed in a process of converting the active material particles into a hollow-form structure in preparation of the active material and creating an inner core, and is connected between the core 1 and the shell 2 to support a space between them. Therefore, the three-dimensional network structure 3b includes a lithium composite metal oxide (hereinafter, simply referred to as a "third lithium composite metal oxide") as a reversible lithium intercalation and deintercalation-available compound (lithiated intercalation compound), the same as the core 1 and the shell 2.

The positive electrode active material 10 according to an exemplary embodiment of the present invention, which has the above-described structure, includes a lithium composite metal oxide, and has a molar ratio of lithium and a composite metal (Li/Me molar ratio) of 1 or more in the transition metal oxide.

More particularly, the first to third lithium composite metal oxides included in the core, shell and buffer layer, respectively, may each independently include a compound of Formula 1 below.

$$Li_aNi_{1-x-y}Co_xM1_yM3_zM2_wO_2 \quad \text{[Formula 1]}$$

(In Formula 1, M1 is at least any one selected from the group consisting of Al and Mn, M2 is any one or two or more elements selected from the group consisting of Zr, Ti, Mg, Ta and Nb, and M3 is any one or two or more elements selected from the group consisting of W, Mo and Cr (1.0≤a≤1.5, 0<x≤0.5, 0<y≤0.5, 0.0005≤z≤0.03, 0≤w≤0.02, and 0<x+y≤0.7) The composition of the lithium composite metal oxide of Formula 1 is an average composition of entire active materials.

The positive electrode active material according to an exemplary embodiment of the present invention includes the lithium composite metal oxide which has the composition of Formula 1, and thus has excellent structural stability and improves the lifespan characteristic of a battery.

Specifically, in the lithium composite metal oxide of Formula 1, Li may be included at a content corresponding to a, that is, 1.0≤a≤1.5. When the a is less than 1.0, the capacity may be probably degraded, and when the a is more than 1.5, particles are sintered in a sintering process, and thus it may be difficult to prepare an active material. In consideration of significant improvement in capacity of the positive electrode active material and the balance of sinterability in the preparation of an active material according to the control of the Li content, the Li may be more specifically included at a content of 1.0≤a≤1.15.

In addition, in the lithium composite metal oxide of Formula 1, Ni may be included at a content corresponding to 1−x−y, that is, 0.3≤1−x−y<1. When the 1−x−y is less than 0.3, the capacity may be probably degraded, and when the 1−x−y is 1 or more, the high temperature stability may be probably degraded. In consideration of the significant improvement in capacity by Ni, the Ni may be more particularly included at a content of 0.5≤1−x−y<0.9.

In addition, in the lithium composite metal oxide of Formula 1, Co may be included at a content corresponding to x, that is, a content of 0<x≤0.5. When the x is 0, the capacity and output characteristics may be probably degraded, and when the x is more than 0.5, a cost may be probably increased. In consideration of the significant improvement in capacity by Co, the Co may be more specifically included at a content of 0.10≤x≤0.35.

The M1 may be included at a content corresponding to y, that is, 0<y≤0.5. When the y is 0, an improved effect according to the inclusion of M1 may not be obtained, and when the y is more than 0.5, there is concern about even degradation in output and capacity characteristics of a battery. In consideration of significant improvement in battery characteristics according to the inclusion of the M1 element, the M1 may be more specifically included at a content of 0<y≤0.2.

In addition, in the lithium composite metal oxide of Formula 1, M3 is an element corresponding to the periodic table Group 6 (VIB Group), and serves to inhibit particle growth during the sintering process in the preparation of active material particles. The M3 may substitute a part of Ni, Co or M1 to allow these elements to be in their right positions in the crystal structure of the positive electrode active material, or may be reacted with lithium to form a lithium oxide. Accordingly, a grain size may be controlled by adjusting the content and input timing of M3. Specifically, the M3 may be any one or two or more elements selected from the group consisting of W, Mo and Cr, and more specifically, at least any one element of W and Cr. Among these, when M3 is W, a battery may have an excellent output characteristic, and when M3 is Cr, a battery may have more excellent lifespan stability.

The M3 may be included at a content corresponding to z of the lithium composite metal oxide of Formula 1, that is, $0.0005 \leq z \leq 0.03$. When z is less than 0.0005, it is not easy to realize an active material satisfying the above-described characteristics, resulting in insignificant improvement in output and lifespan characteristics. In addition, when z is more than 0.03, distortion or breakage of the crystal structure may be caused, and migration of lithium ions is disturbed, thereby degrading the battery capacity. In consideration of realization of a particle structure according to the control of the content in M3 element and significant improvement in battery characteristics thereby, z may be, more specifically, $0.001 \leq z \leq 0.01$.

In addition, the lithium composite metal oxide of Formula 1, or Ni, Co and M1 elements in the lithium composite metal oxide may be partly substituted or doped with a different element, that is, M2, to improve the battery characteristics through the adjustment of distribution of metal elements in an active material. The M2 may be, specifically, any one or two or more elements selected from the group consisting of Zr, Ti, Mg, Ta and Nb, and more specifically, Ti or Mg.

The M2 element may be included at an amount corresponding to w within a range that does not degrade the characteristics of the positive electrode active material, which is $0 \leq w \leq 0.02$.

In addition, in the positive electrode active material, at least any one metal element of the nickel, M1 and cobalt included in the lithium composite metal oxide of Formula 1 may show a concentration gradient to be increased or decreased in any one region of the core, shell and active material particles. Specifically, the nickel, cobalt and M1 included in the positive electrode active material may be distributed from the center to the surface of a particle of the positive electrode active material, or such that an average slope of each concentration profile in the core and shell becomes positive (+) or negative (−).

In the present invention, the concentration gradient or concentration profile of a metal element refers to a graph showing the content of the metal element according to the depth of the center from the particle surface, provided that the X axis represents the depth of the center from the particle surface, and the Y axis represents the content of the metal element. As an example, the positive average slope of the concentration profile means that a relatively large amount of corresponding metal elements is present in a particle center region than a particle surface region, and the negative average slope of the concentration profile means that a relatively large amount of metal elements is located in the particle surface region than the particle center region. In the present invention, the concentration gradient and the concentration profile of a metal in the active material may be detected using a method such as X-ray Photoelectron Spectroscopy (XPS), Electron Spectroscopy for Chemical Analysis (ESCA), Electron Probe Micro Analyzer (EPMA), Inductively Coupled Plasma-Atomic Emission Spectrometer (ICP-AES), or Time of Flight Secondary Ion Mass Spectrometry (ToF-SIMS). For example, when the profile of the metal elements in the active material is confirmed using XPS, the concentration profile of the metal elements may be confirmed by etching the active material in a direction from the particle surface to the center, and measuring a metal atomic ratio per etching time.

Specifically, at least one metal element of the nickel, cobalt and M1 may have a concentration gradient in which a metal concentration is continuously changed in any one region of the core, shell and entire active material particles, and more specifically, throughout the entire active material particles, and may have one or more values of the concentration gradient slope of the metal element. Due to the continuous concentration gradient, there is no drastic phase boundary region from the center to the surface, resulting in stabilization of a crystal structure and increased thermal stability. In addition, when the metal has a constant concentration gradient, the improvement in structural stability may be further increased. In addition, as the concentration of each metal in the active material particles is changed by the concentration gradient, the improvement in battery performance caused by the positive electrode active material may be more increased effectively using the characteristics of the corresponding metal.

In the present invention, the "metal concentration continuously exhibits a concentration gradient" means that the concentration of a metal is present in a concentration distribution which is gradually changed throughout whole particles. Specifically, the concentration distribution may mean that the difference in metal concentration per 1 μm is 0.1 atom % to 30 atom %, more specifically 0.1 atom % to 20 atom %, and further more specifically 1 atom % to 10 atom % in particles based on the total atomic content of the corresponding metal included in the positive electrode active material.

More specifically, in the positive electrode active material according to an exemplary embodiment of the present invention, at least any one metal element of the nickel, cobalt and M1 exhibits a concentration gradient which is continuously changed throughout the whole active material particles, and the concentration gradient slope of the metal element in the active material particles may have one or more values.

In addition, in the positive electrode active material according to an exemplary embodiment of the present invention, at least any one metal element of the nickel, cobalt and M1 each independently exhibits a continuously changed concentration gradient in the core and the shell, and the concentration gradients slope of metal elements in the core and the shell may be the same or different.

More specifically, in the positive electrode active material according to an exemplary embodiment of the present invention, the concentration of nickel included in the positive electrode active material may be decreased with a continuous concentration gradient in a direction from the center to the surface of the active material particle; or decreased with a continuous concentration gradient in a direction from the center to the surface of the active material particle in each of the core and the shell. Here, the concentration gradient slope of the nickel may be uniform from the center to the surface of the positive electrode active material particle, or in each of the core and the shell. As such, when the nickel may have a concentration gradient in which a concentration is highly maintained in the center of the active material particle, and gradually decreased towards the particle surface, thermal stability may be exhibited and a decrease in capacity may be prevented.

In addition, in the positive electrode active material according to an exemplary embodiment of the present invention, the concentration of cobalt included in the positive electrode active material may be increased with a continuous concentration gradient in a direction from the center to the surface of an active material particle; or may be increased with a continuous concentration gradient in a direction from the center to the surface of the active material particle in each of the core and the shell. Here, the concentration gradient slope of the cobalt may be uniform from the center to the surface of the positive electrode active material particle, or in each of the core and the shell. As such, when the cobalt may have a concentration gradient in which a concentration is lowly maintained in the center of the active material particle, and gradually increased towards the particle surface, the amount of the cobalt used may be reduced, and a decrease in capacity may be prevented.

In addition, in the positive electrode active material according to an exemplary embodiment of the present invention, the concentration of M1 included in the positive electrode active material may be increased with a continuous concentration gradient in a direction from the center to the surface of an active material particle; or may be increased with a continuous concentration gradient in a direction from the center to the surface of the active material particle in each of the core and the shell. Here, the concentration gradient slope of the M1 may be uniform from the center to the surface of the positive electrode active material particle, or in each of the core and the shell. As such, when the M1 may have a concentration gradient in which a concentration is lowly maintained in the center of the active material particle, and gradually increased towards the particle surface, thermal stability may be improved without a decrease in capacity. More specifically, the M1 may be manganese (Mn).

In addition, in the positive electrode active material according to an exemplary embodiment of the present invention, the content of nickel included in the core may be larger than that of nickel included in the shell, and specifically, the core may include nickel at a content of 60 atom % or more and less than 100 atom % with respect to the total atomic content of the metal element included in the core, and the shell may include nickel at a content of 30 atom % to less than 60 atom % with respect to the total atomic content of the metal element included in the shell.

In addition, in the positive electrode active material according to an exemplary embodiment of the present invention, the content of cobalt included in the core may be less than that of cobalt included in the shell.

In addition, in the positive electrode active material according to an exemplary embodiment of the present invention, the content of M1 included in the core may be less than that of M1 included in the shell.

In addition, in the positive electrode active material according to an exemplary embodiment of the present invention, nickel, cobalt and M1 each independently exhibit a continuously changed concentration gradient throughout the whole active material particle, a concentration of the nickel may be decreased with a continuous concentration gradient in a direction from the center to the surface of the active material particle, and concentrations of the cobalt and M1 may be each independently increased with a continuous concentration gradient in a direction from the center to the surface of the active material particle.

In addition, in the positive electrode active material according to an exemplary embodiment of the present invention, nickel, cobalt and M1 each independently exhibit a continuously changed concentration gradient in each of the core and the shell, and a concentration of the nickel may be decreased with a continuous concentration gradient from the center of the core to an interface between the core and a buffer layer, and from an interface between the buffer layer and the shell to the shell surface, and concentrations of the cobalt and M1 may be each independently increased with a continuous concentration gradient from the center of the core to an interface between the core and a buffer layer, and from an interface between the buffer layer and the shell to the shell surface.

As such, due to a concentration gradient in which the nickel concentration is decreased, and cobalt and M1 concentrations are increased towards the surface of the positive electrode active material particle partly or entirely in the active material, the capacity characteristic may be maintained and the thermal stability may be exhibited.

In addition, the positive electrode active material according to an exemplary embodiment of the present invention may include a polycrystalline lithium composite metal oxide particle which has an average size of the crystal particle of 200 nm or less, and particularly, 60 nm to 200 nm.

The average size of the crystal particle in the positive electrode active material is optimized to exhibit a high output characteristic by controlling the content of the M3 element included in the lithium composite metal oxide and sintering conditions in the preparation thereof. Specifically, the average size of the crystal particle constituting the polycrystalline lithium composite metal oxide may be 60 nm to 150 nm, and in consideration of significant improvement in output characteristic according to the control of the crystal size, the average size of the crystal particle may be more specifically 80 nm to 120 nm.

In the present invention, the "polycrystalline" refers to a crystalline body consisting of two or more crystal particles. Also, in the present invention, the crystal particles constituting the polycrystalline refer to primary particles, and the polycrystalline refers to a type of secondary particles which are prepared through agglomeration of the primary particles.

In addition, in the present invention, the average size of the crystal particle may be quantitatively analyzed on the lithium composite metal oxide using X-ray diffraction. For example, the average size of the crystal particle may be quantitatively analyzed by analyzing a diffraction lattice generated by inputting the polycrystalline lithium composite metal oxide particles in a holder and irradiating the particles with X-ray.

In addition, the positive electrode active material according to an exemplary embodiment of the present invention may have a Ni disorder in the crystal of the lithium composite metal oxide of 0.2% to 3.0%. Due to the low Ni disorder, a battery may exhibit excellent cycle efficiency and capacity characteristic. More specifically, the Ni disorder may be 0.5% to 2%, and further more specifically, 0.5% to 1.5%.

In the present invention, the Ni disorder may be determined from an amount of Ni ions disordered to a Li site in the synthesis of a positive electrode active material. Specifically, the Ni disorder may be determined by performing an atomic structure analysis using the Rietveld method, analyzing a relative amount of $Ni^{2+}$ ions accounting for the Li site therefrom, analyzing a relative occupancy ratio by oxygen in an oxygen site from a diffraction diagram obtained from each sample pattern, and then determining an amount of Ni ions irregulated to a Li site during synthesis therefrom. Here, the oxygen occupancy ratio z is determined as a numeric variable, Li and Ni occupancy ratios represent a single variable x, which can be changed between two sites, and an occupancy ratio of the Li site by M1 ions and an occupancy ratio of the Ni site by Co and Ni ions are expressed as Formula 1 and processed as predetermined. A first cycle efficiency may be improved according to a decrease in the nickel disorder (% Ni$^+$) x and an increase in the relative oxygen concentration z.

The positive electrode active material having the above-described structure may have an average particle diameter ($D_{50}$) of 8 μm to 15 μm in consideration of a specific surface area and a positive electrode mixture density. When the average particle diameter of the positive electrode active material is less than 8 μm, dispersion in an active material layer may be probably decreased due to a decrease in stability of lithium composite metal oxide particles and agglomeration between the positive electrode active materials, and when the average particle diameter of the positive electrode active material is more than 15 μm, there is concern about a decrease in mechanical strength of the positive electrode active material and a decrease in output characteristic according to the decreased specific surface area. In addition, in consideration of the improvement in rat capability and initial capacity characteristic due to its specific structure, the positive electrode active material may have an average particle diameter ($D_{50}$) of 9 μm to 12 μm.

In the present invention, the average particle diameter ($D_{50}$) of the positive electrode active material may be defined as a particle diameter based on 50% particle diameter distribution. In the present invention, the average particle diameter ($D_{50}$) of the positive electrode active material may be measured by electron microscopy, for example, scanning electron microscopy (SEM) or field emission scanning electron microscopy (FE-SEM), etc., or a laser diffraction method. In the measurement by the laser diffraction method, more specifically, particles of the positive electrode active material may be dispersed in a dispersion medium, introduced into a commercially available laser diffraction particle analyzer (e.g., Microtrac MT 3000) and subjected to approximately 28-kHz ultrasonication with an output of 60 W, thereby calculating the average particle diameter ($D_{50}$) based on 50% of the particle diameter distribution in the analyzer.

In addition, in the positive electrode active material, a ratio of a core radius to the radius of the positive electrode active material particle is more than 0 and less than 0.4, and a ratio of the length from the center of the active material particle to the interface between the buffer layer and the shell with respect to the radius of the positive electrode active material particle may be more than 0 and less than 0.7.

In addition, in the positive electrode active material, a shell area determined by Equation 1 below may be 0.2 to less than 1, and preferably, 0.4 to 0.6.

Shell area=(radius of positive electrode active material−core radius−thickness of buffer layer)/radius of positive electrode active material [Equation 1]

When the core, buffer layer and shell are formed in the positive electrode active material in the above-mentioned ratio, and a concentration gradient of a metal element is formed in each region, the distribution of nickel, cobalt and manganese in the active material particles is controlled to be more optimized, and therefore, the breakage of the active material caused by rolling in manufacture of an electrode may be minimized, and reactivity with an electrolyte solution may be maximized, thereby much more improving the output and lifespan characteristics of a secondary battery.

In the present invention, a particle diameter of the core part may be measured by particle cross-section analysis using a forced ion beam (fib).

In addition, the positive electrode active material according to an exemplary embodiment of the present invention may have a BET specific surface area of 0.2 m$^2$/g to 0.5 m$^2$/g.

When the BET specific surface area of the positive electrode active material is greater than 0.5 m$^2$/g, there are concerns about decreased dispersibility of the positive electrode active material in an active material layer due to the agglomeration between the positive electrode active materials and an increased resistance in the electrode, and when the BET specific surface area of the positive electrode active material is less than 0.2 m$^2$/g, there are concerns about decreased dispersibility of the positive electrode active material itself and decreased capacity. In the present invention, the specific surface area of the positive electrode active material is measured by the Brunauer-Emmett-Teller (BET) method, and specifically, it can be calculated from an adsorption amount of nitrogen gas at a liquid nitrogen atmosphere (77K) using BELSORP-mini II (BEL Japan).

In addition, the positive electrode active material according to an exemplary embodiment of the present invention may exhibit excellent capacity and charge/discharge characteristics by simultaneously satisfying the conditions of the average particle diameter and the BET specific surface area. Specifically, the positive electrode active material may have an average particle diameter ($D_{50}$) of 8 μm to 15 μm and a BET specific surface area of 0.2 m$^2$/g to 0.5 m$^2$/g, more specifically, an average particle diameter ($D_{50}$) of 8 μm to 10 μm and a BET specific surface area of 0.25 m$^2$/g to 0.35 m$^2$/g, and further more specifically, an average particle diameter (D50) of 8 μm or more and less than 10 μm and a BET specific surface area of more than 0.25 m$^2$/g and 0.35 m$^2$/g or less. In the present invention, the specific surface area of the positive electrode active material is measured by the BET method, and specifically, it can be calculated from an adsorption amount of nitrogen gas at a liquid nitrogen atmosphere (77K) using BELSORP-mini II (BEL Japan).

In addition, the positive electrode active material according to an exemplary embodiment of the present invention may further include one or more surface treatment layers including at least one or more coating elements which is able to protect the surface of the active material such as boron (B), aluminum (Al), titanium (Ti), silicon (Si), tin (Sn), magnesium (Mg), iron (Fe), bismuth (Bi), antimony (Sb) or zirconium (Zr) on the surface of the active material particle.

Specifically, the surface treatment layer may have a single layer structure including one of the coating element, or comprise two or more coating elements in the single layer. In addition, the surface treatment layer may have a multi-layer structure having two or more layers by repeatedly forming one or more surface treatment layers each including one of the coating element.

More specifically, when boron is used as the coating element, the surface treatment layer may be formed of a boron lithium oxide. Particularly, since the boron lithium oxide may be uniformly formed on the surface of the positive electrode active material, a more excellent positive electrode active material protective effect may be exhibited. The boron lithium oxide may be, specifically, $LiBO_2$ or $Li_2B_4O_7$, etc., or may include any one or a mixture of two or more thereof.

In addition, the surface treatment layer may include boron at an amount of 100 ppm to 2000 ppm, and more specifically, 250 to 1100 ppm.

In addition, the boron lithium oxide included in the surface treatment layer may be included at 0.01 wt % to 1 wt %, and particularly, 0.05 wt % to 0.5 wt % with respect to the total weight of the positive electrode active material. When the boron lithium oxide is less than 0.01 wt %, the surface treatment layer formed on the surface of the lithium composite metal oxide becomes thinner, and therefore there may be an insignificant effect of inhibiting a side reaction between electrolyte solutions in charging/discharging. When the boron lithium oxide is more than 1 wt %, the surface treatment layer becomes thicker due to an excessive amount of the boron lithium oxide, thereby inducing an increase in resistance, and therefore the electrochemical characteristic of a lithium secondary battery may be reduced.

In addition, according to an exemplary embodiment of the present invention, the surface treatment layer may be formed by dry mixing the positive electrode active material including the lithium composite metal oxide with a boron-containing compound, and thermally treating the resulting mixture. Accordingly, some of boron elements of the boron lithium oxide included in the surface treatment layer may be doped into the lithium composite metal oxide of the positive electrode active material, and a boron content doped into the lithium composite metal oxide may have a concentration gradient which is decreased from the surface to the inside of the lithium composite metal oxide. When the concentration gradient of boron is created from the inside of the surface treatment layer to the inside of the positive electrode active material as described above, the cycle characteristic may be improved due to an increase in structural stability.

In addition, when aluminum is used as the coating element, a surface treatment layer may be formed of an aluminum oxide, and in the case of aluminum, unlike boron, the surface treatment layer may be formed on the surface of the positive electrode active material in a discontinuous pattern, for example, an island form. The aluminum present on the surface of the positive electrode active material is transformed into $AlF_3$ by a reaction with hydrogen fluoride (HF) to protect the surface of the active material from HF attack. The aluminum may be included in an oxide form such as, specifically, $Al_2O_3$.

For example, the aluminum-containing surface treatment layer may be formed by dry mixing the positive electrode active material including the lithium composite metal oxide with an aluminum-containing compound, and thermally treating the resulting mixture. Here, by the control of a particle size of the aluminum-containing compound, a change in crystal structure of the aluminum oxide included in the surface treatment layer may be inhibited, resulting in improved cycle stability in charging/discharging.

In addition, in the case of the coating element such as titanium (Ti), silicon (Si), tin (Sn), magnesium (Mg), iron (Fe), bismuth (Bi), antimony (Sb) or zirconium (Zr), the surface treatment layer is formed on the surface of the positive electrode active material in the form of an oxide such as $TiO_2$, $SiO_2$, $SnO_2$, $MgO$, $Fe_2O_3$, $Bi_2O_3$, $Sb_2O_3$, or $ZrO_2$ to protect the positive electrode active material.

Even using the above-mentioned coating element, the surface treatment layer may be formed by the same method as used for the aluminum.

Meanwhile, the surface treatment layer may have a thickness of 10 nm to 1000 nm.

When the thickness of the surface treatment layer formed on the surface of the active material is 1000 nm or less, the internal resistance of the active material may be reduced, a decrease in discharge potential is prevented, and thus the discharge potential characteristic may be maintained highly according to a change in current density (C-rate). As a result, the excellent lifespan characteristic and a reduced discharge voltage may be exhibited, compared to when applied to a battery.

In addition, the positive electrode active material according to an exemplary embodiment of the present invention may have a tap density of 1.7 g/cc or more, or 1.7 g/cc to 2.5 g/cc. Due to the high tap density in the above range, a high capacity characteristic may be exhibited. In the present invention, the tap density of the positive electrode active material may be measured using a conventional tap density measurer, and specifically, a tap density tester.

Meanwhile, according to another exemplary embodiment of the present invention, the positive electrode active material according to an exemplary embodiment of the present invention, which has the above-described structure and physical properties, may be prepared by a preparation method, which includes: preparing a reaction solution in which a seed of a metal-containing hydroxide or oxyhydroxide is generated by adding an ammonium cation-containing complexing agent and a basic compound to a metal raw material mixture including a nickel raw material, a cobalt raw material and an M1 raw material (here, M1 is at least any one element selected from the group consisting of Al and Mn) to induce coprecipitation at pH 11 to 13 (Step 1); growing the metal-containing hydroxide or oxyhydroxide particles by adding an ammonium cation-containing complexing agent and a basic compound to the reaction solution until the reaction solution reaches pH 8 or more and less than pH 11 (Step 2); and mixing the grown metal-containing hydroxide or oxyhydroxide particles with a lithium raw material and an M3 raw material (here, M3 is one or two or more elements selected from the group consisting of W, Mo and Cr) and then thermally treating the resulting mixture (Step 3). Here, when the positive electrode active material further includes M2 (here, M2 is any one or two or more elements selected from the group consisting of Zr, Ti, Mg, Ta and Nb), an M2 raw material may be added in the preparation of the metal raw material mixture in Step 1, or in the mixing with a lithium raw material in Step 3. As described above, according to another exemplary embodiment of the present invention, the above-described method of preparing a positive electrode active material is provided.

Hereinafter, explaining the method by steps in further detail, in the method of preparing a positive electrode active material, Step 1 is to prepare a reaction solution in which a seed of a metal-containing hydroxide or oxyhydroxide is generated by adding an ammonium cation-containing complexing agent and a basic compound to a metal raw material mixture including nickel, cobalt, M1 and selectively M2, and coprecipitating the resulting mixture at pH 11 to pH 13.

Specifically, the metal raw material mixture may be prepared by adding a nickel raw material, a cobalt raw material, an M1-containing raw material and selectively an M2-containing raw material to a solvent, specifically, water, or a mixture of an organic solvent capable of being uniformly mixed with water (e.g., an alcohol, etc.) and water, or preparing a solution including each of the raw materials, specifically, an aqueous solution, and mixing the raw materials. Here, each raw material may be used at a suitable content in consideration of the content of each metal element in the finally-prepared lithium composite metal oxide.

Specifically, a total number of moles of nickel ions, cobalt ions and manganese ions may be 0.5M to 2.5M, and more specifically, 1M to 2.2M. In addition, a raw material of transition metal may be continuously provided to maintain the above-mentioned ion concentration according to the precipitation rate of a transition metal hydroxide.

As a raw material including the above-mentioned metal elements, an acetate, a nitrate, a sulfate, a halide, a sulfide, a hydroxide, an oxide or an oxyhydroxide may be used, and is not particularly limited as long as it is able to be dissolved in water.

In one example, as the cobalt raw material, $Co(OH)_2$, CoOOH, $Co(OCOCH_3)_2 \cdot 4H_2O$, $Co(NO_3)_2 \cdot 6H_2O$ or $Co(SO_4)_2 \cdot 7H_2O$ may be used, which may be used alone or in combination of two or more thereof.

In addition, as the nickel raw material, $Ni(OH)_2$, NiO, NiOOH, $NiCO_3 \square 2Ni(OH)_2 \square 4H_2O$, $NiC_2O_2 \square 2H_2O$, $Ni(NO_3)_2 \square 6H_2O$, $NiSO_4$, $NiSO_4 \square 6H_2O$, nickel adipate or nickel halide may be used, which may be used alone or in combination of two or more thereof.

In addition, as the manganese raw material, manganese oxides such as $Mn_2O_3$, $MnO_2$, and $Mn_3O_4$; manganese salts such as $MnCO_3$, $Mn(NO_3)_2$, $MnSO_4$, manganese acetate, dicarboxylic acid manganese salt, manganese citrate and fatty acid manganese salt; oxyhydroxide, and manganese chloride may be used, which may be used alone or in combination of two or more thereof.

In addition, as the aluminum raw material, $AlSO_4$, $AlCl$, or $AlNO_3$ may be used, which may be used alone or in combination of two or more thereof.

Subsequently, a reaction solution in which a seed of a metal-containing hydroxide or oxyhydroxide is generated may be prepared by adding an ammonium cation-containing complexing agent and a basic compound to the metal raw material mixture prepared as described above, and coprecipitating the resulting mixture at pH 11 to pH 13.

The ammonium cation-containing complexing agent may be, specifically, $NH_4OH$, $(NH_4)_2SO_4$, $NH_4NO_3$, $NH_4Cl$, $CH_3COONH_4$, or $NH_4CO_3$, which may be used alone or in combination of two or more thereof. In addition, the ammonium cation-containing complexing agent may be used in form of an aqueous solution. Here, as a solvent, water, or a mixture of an organic solvent capable of being uniformly mixed with water (e.g., an alcohol, etc.) and water may be used.

The ammonium cation-containing complexing agent may be added at a molar ratio of 0.5 to 1 with respect to 1 mole of the metal raw material mixture. Generally, while a chelating agent is reacted with a metal at a molar ratio of 1:1 or more, thereby forming a complex, a non-reacted complex of the formed complexes, which is not reacted with a basic aqueous solution, may be changed into an intermediate product, collected and then reused as a chelating agent. Therefore, in the present invention, compared to the conventional art, an amount of the chelating agent used may be reduced. As a result, the positive electrode active material may be increased in crystallinity, and stabilized.

The basic compound may be a hydroxide or hydrate of an alkali metal or alkali earth metal such as NaOH, KOH or $Ca(OH)_2$, which may be used alone or in combination of two or more thereof. The basic compound may also be used in the form of an aqueous solution. Here, as a solvent, water, or a mixture of an organic solvent capable of being uniformly mixed with water (e.g., an alcohol, etc.) and water may be used.

In addition, the coprecipitation to form a seed of the metal-containing hydroxide or oxyhydroxide may be performed at pH 11 to 13. When the pH is beyond the above-described range, there is concern about a change in size of a hydroxide or oxyhydroxide that will be prepared, or particle splitting. In addition, there is another concern about the formation of various types of oxides by side reactions due to elution of metal ions from the surface of the hydroxide or oxyhydroxide. More specifically, the coprecipitation may be performed under the condition in which the mixed solution has a pH of 11 to 12.

To satisfy the above-mentioned pH range, the ammonium cation-containing complexing agent and the basic compound may be used at a molar ratio of 1:10 to 1:2. Here, the pH value means a pH value at a liquid temperature of 25° C.

The coprecipitation may be performed at a temperature of 40° C. to 70° C. in an inert atmosphere such as nitrogen. In addition, to increase a reaction rate in the reaction, stirring may be selectively performed, and here, a stirring rate may be 100 rpm to 2000 rpm.

According to the above-described process, seeds of the metal-containing hydroxide or oxyhydroxide are generated and precipitated in a reaction solution. Specifically, the metal-containing hydroxide or oxyhydroxide may include a compound of Formula 2 below.

$$Ni_{1-x1-y1}Co_{x1}M1_{y1}M3_{z1}M2_{w1}A \qquad \text{[Formula 2]}$$

(In Formula 2, M1 is at least any one selected from the group consisting of Al and Mn, M2 is any one or two or more elements selected from the group consisting of Zr, Ti, Mg, Ta and Nb, and M3 is any one or two or more elements selected from the group consisting of W, Mo and Cr ($0<x1\leq0.5$, $0<y1\leq0.5$, $0.0005\leq z1\leq0.03$, $0\leq w1\leq0.02$, and $0<x1+y1\leq0.7$), and A is a hydroxyl group or oxyhydroxyl group).

In addition, the precipitated metal-containing hydroxide or oxyhydroxide may be separated by the conventional method, and then selectively subjected to a drying process.

The drying process may be performed by a conventional drying method, and specifically, performed by heating or hot air injection in a temperature range of 100° C. to 200° C. for 15 hours to 30 hours.

Subsequently, in the method of preparing the positive electrode active material, Step 2 is to prepare particles by growing the seed of the metal-containing hydroxide or oxyhydroxide prepared in Step 1.

Specifically, the metal-containing hydroxide or oxyhydroxide particles may be grown by adding an ammonium cation-containing complexing agent and a basic compound to the reaction solution in which the seed of the metal-containing hydroxide or oxyhydroxide is generated until the pH of the reaction solution becomes lower than that in the coprecipitation.

The growth of the metal-containing hydroxide or oxyhydroxide particles may include adding a second metal raw material mixture including nickel, cobalt, and M1-containing raw materials at different concentrations from a first metal raw material mixture including a nickel raw material, a cobalt raw material and an M1-containing raw material to the first metal raw material mixture such that a mixed ratio is gradually changed from 100 vol %:0 vol % to 0 vol %:100 vol %.

As such, metal-containing hydroxides or oxyhydroxides which have concentration gradients of nickel, cobalt and M1 each independently changed continuously from the center to the surface of the particle may be prepared by continuously increasing an input amount of the second metal raw material mixture with respect to the first metal raw material mixture and controlling a reaction rate and a reaction time. The concentration gradient of the metal in the hydroxide or oxyhydroxide generated herein and the slop thereof may be easily adjusted by the composition and a mixed ratio of the first metal raw material mixture and the second metal raw material mixture. To create a high density state in which the concentration of a specific metal is high, a reaction time may be given longer, and a reaction rate may be reduced, and to create a low density state in which the concentration of a specific metal is low, a reaction time may be given shorter, and a reaction rate may be increased.

Specifically, a rate of the second metal raw material mixture added to the first metal raw material mixture may be continuously increased within a range of 1% to 30% with respect to the initial input rate. Specifically, the input rate of the first metal raw material mixture may be 150 ml/hr to 210 ml/hr, the input rate of the second metal raw material mixture may be 120 ml/hr to 180 ml/hr, and the input rate of the second metal raw material mixture may be continuously increased within a range of 1% to 30% with respect to the initial input rate within the above-mentioned input rate range. Here, the reaction may be performed at 40° C. to 70° C. In addition, the size of a precursor particle may be adjusted by controlling an input amount of the second metal raw material mixture with respect to the first metal raw material mixture and a reaction time.

The growth of the metal-containing hydroxide or oxyhydroxide particles in Step 2 may be performed at a pH lower than that in the generation of the metal-containing hydroxide or oxyhydroxide particles in Step 1, and particularly, such a process may be performed at pH 8 or more and less than pH 11, which is lower than that in Step 1, and more specifically, in a range of pH 8 to 10.5.

The growth of the metal-containing hydroxide or oxyhydroxide particles may be performed while changing the pH rate of a reactant to pH 1 to 2.5 per hour. As the reaction is carried out at the above-mentioned pH changing rate at a lower pH than that in the coprecipitation, a desired particle structure may be easily formed.

In addition, when an ammonium cation-containing complexing agent and a basic compound are added to the reaction solution in which the metal-containing hydroxide or oxyhydroxide particles are generated, they may be input at the same rate, or may be input while continuously decreasing the input rate. When the ammonium cation-containing complexing agent and the basic compound may be input while decreasing the input rate, the input rate may be decreased with a reduction rate of 20% or more and less than 100%.

The precipitation rate of the metal-containing hydroxide or oxyhydroxide in the particle growth step may be faster than that of the metal-containing hydroxide or oxyhydroxide in Step 1 by controlling the input rates, concentrations and a reaction temperature of the ammonium cation-containing complexing agent and the basic compound as described above. As a result, a particle growth direction in a subsequent thermal treatment process may be easily induced by reducing a density in the proximity of the outer surface of the metal-containing hydroxide or oxyhydroxide particles which become a precursor.

In addition, the process in Step 2 may be performed in an inert atmosphere.

After the process in Step 2, the grown metal-containing hydroxide or oxyhydroxide particles may be separated from the reaction solution, and then further selectively subjected to subsequent washing and drying processes.

The drying process may be performed by a conventional drying method, particularly, heating or hot air injection in a temperature range of 100° C. to 120° C.

Subsequently, in the method of preparing a positive electrode active material, Step 3 is a step of preparing a positive electrode active material having a structure in which a buffer layer is interposed between a core and a shell by mixing the metal-containing hydroxide or oxyhydroxide particles grown in Step 2 with a lithium raw material and an M3 raw material, and selectively an M2 raw material and then thermally treating the resulting mixture. Here, the M2 raw material may be the same as described above.

The thermal treatment process may be performed at 250° C. to 1000° C., or 800° C. to 900° C. When the thermal treatment temperature is less than 250° C., a reaction between compounds used is not sufficiently performed, and when the thermal treatment temperature is more than 1000° C., there is concern about formation of an instable structure due to Li evaporation in the crystal structure.

The thermal treatment process may be performed in multiple steps including 2 to 3 steps by adding a low temperature thermal treatment process for maintaining a concentration gradient and particle orientation. Specifically, the thermal treatment process may be performed at 250° C. to 450° C. for 5 hours to 15 hours, at 450° C. to 600° C. for 5 hours to 15 hours, and at 700° C. to 900° C. for 5 hours to 15 hours.

While time for the thermal treatment process may vary depending on a thermal treatment temperature, the shape of the particles may be easily controlled by 5-hour to 48-hour or 10-hour to 20-hour thermal treatment under the above-mentioned temperature range. Specifically, when the time for the thermal treatment is less than 5 hours, crystallization may not be performed, and when the time for the thermal treatment is more than 48 hours, crystallization may be excessively performed, or an unstable structure may be formed by Li evaporation in the crystal structure.

In the metal-containing hydroxide or oxyhydroxide particles generated and grown through Steps 1 and 2, due to a difference in process conditions during the manufacturing process, such as pH, crystals formed inside and then formed outside according to the particle growth have different properties. That is, the crystals formed inside at a high pH are shrunken in the thermal treatment process as described above, and the crystals formed at low pH and temperature are grown. Accordingly, the shrunken crystals form a core, and the crystals grown outwards form a shell. Due to the formation of such core and shell, a pore is formed between the core and the shell, and at the same time, the crystals located between the core and the shell form a three-dimensional network structure connecting the core and the shell of particles. In addition, the outer crystal of the particle (shell) is radially grown from the center of the particle to the outside, thereby having crystal orientation.

The lithium-containing raw material may include lithium-containing carbonates (e.g., lithium carbonate, etc.), hydrates (e.g., lithium hydroxide monohydrate (LiOH☐H$_2$O), etc.), hydroxides (e.g., lithium hydroxide, etc.), nitrates (e.g., lithium nitrate (LiNO$_3$), etc.), and chlorides (e.g., lithium chloride (LiCl), etc.), and may be used alone or in combination of two or more thereof. In addition, an amount of the lithium-containing raw material used may be determined by the contents of lithium and a composite metal in a lithium composite metal oxide which is finally prepared. Specifically, the lithium-containing raw material may be used such that a molar ratio of lithium included in the lithium raw material and a metal element (Me) included in the metal-containing hydroxide (a molar ratio of lithium/metal element (Me)) reaches 1.0 or more.

As the M3 raw material, an acetate, nitrate, sulfate, halide, sulfide, hydroxide, oxide or oxyhydroxide, etc., which includes an M3 element may be used. In one example, when M3 is W, tungsten oxide may be used as the M3 raw material. The M3 raw material may be used to satisfy the content condition of the M3 element in the finally-prepared positive electrode active material.

When the metal-containing hydroxide or oxyhydroxide is mixed with the lithium-containing raw material, a sintering agent may be selectively added. The sintering agent may be, specifically, an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and may be used alone or in combination of two or more thereof. The sintering agent may be used at 0.01 mol to 0.2 mol with respect to 1 mol of the positive electrode active material precursor. When the content of the sintering agent is excessively low, which is less than 0.01 mol, an improvement effect of a sintering characteristic of the positive electrode active material precursor may be insignificant, or when the content of the sintering agent is excessively high, which is more than 0.2 mol, because of the excessive sintering agent, there are concerns about a degradation in performance as the positive electrode active material and a decrease in initial capacity of a battery during charging/discharging.

In the thermal treatment process, a sintering additive may be selectively added.

When the sintering additive is added, a crystal may be easily grown at a low temperature, and a non-uniform reaction during dry mixing may be minimized. In addition, the sintering additive is effective in making edges of the primary particle of the lithium composite metal oxide rounded to form a circular curved particle. Generally, in a lithium oxide-based positive electrode active material including manganese, the manganese is frequently eluted from the edges of the particle, and such manganese elution, a characteristic of a secondary battery, particularly, the lifespan characteristic at a high temperature is degraded. Here, when a sintering additive is used, the edges of the primary particle are rounded, thereby reducing the manganese elution region, and therefore the stability and the lifespan characteristic of a secondary battery may be improved.

Specifically, the sintering additive may include boron compounds such as boric acid, lithium tetraborate, boron oxide, ammonium borate, etc.; cobalt compounds such as cobalt(II) oxide, cobalt(III) oxide, cobalt(IV) oxide, tricobalt tetroxide, etc.; vanadium compounds such as vanadium oxide, etc.; lanthanum compounds such as lanthanum oxide, etc.; zirconium compounds such as zirconium boride, calcium silicate zirconium, zirconium oxide, etc.; yttrium compounds such as yttrium oxide, etc.; or gallium compounds such as gallium oxide, etc., and may be used alone or in combination of two or more thereof.

The sintering additive may be used at 0.2 parts by weight to 2 parts by weight, and more particularly, 0.4 parts by weight to 1.4 parts by weight with respect to the total weight of the precursor.

In addition, when the metal-containing hydroxide or oxyhydroxide is mixed with the lithium-containing raw material, a moisture scavenger may be selectively added. Specifically, the moisture scavenger may be citric acid, tartaric acid, glycolic acid or maleic acid, and used alone or in combination of two or more thereof. The moisture scavenger may be used at 0.01 mol to 0.2 mol with respect to 1 mol of a precursor of the positive electrode active material.

In addition, the thermal treatment process performed on the metal-containing hydroxide or oxyhydroxide particles and the mixture of the lithium raw material, the M3 raw material and selectively the M2 raw material can be performed in an air atmosphere or oxidizing atmosphere (e.g., $O_2$ etc.), and more specifically, performed in an oxidizing atmosphere.

Meanwhile, after the thermal treatment process, a washing process for removing impurities present on the surface of the prepared positive electrode active material may be selectively performed.

The washing process may be performed according to a conventional method, and specifically, by washing with water or lower alcohols having 1 to 4 carbon atoms.

The method of preparing a positive electrode active material according to an exemplary embodiment of the present invention may further include forming a surface treatment layer on the surface of the positive electrode active material after the process of preparing a positive electrode active material including the lithium composite metal oxide.

The process of forming a surface treatment layer may be performed by a conventional method of forming a surface treatment layer such as a solid-phase synthesis method or wet method, except the use of a raw material containing a coating element for forming a surface treatment layer. In addition, the coating element is the same as described above.

Specifically, when the solid-phase synthesis method is used, a surface treatment layer including a coating element-containing compound may be formed on the surface of the positive electrode active material by dry mixing the prepared positive electrode active material with a boron-containing compound and thermally treating the resulting mixture. As such, when a surface treatment layer is formed by the solid-phase synthesis method, a uniform surface treatment layer can formed without damage to the positive electrode active material.

In one example, when the coating element is boron (B), the boron-containing compound may be, specifically, a boron-containing oxide, a hydroxide, an alkoxide or an alkylate. More specifically, the boron-containing compound may be $H_3BO_3$, $B_2O_3$, $C_6H_5B(OH)_2$, $(C_6H_5O)_3B$, $[CH_3(CH_2)_3O]_3B$, $C_3H_9B_3O_6$ or $(C_3H_7O)_3B$, and may be used alone or in combination of two or more thereof.

An amount of the boron-containing compound used may be a suitable content considering the content of the boron in a finally-manufactured surface treatment layer or boron lithium oxide, which is described above. Specifically, the boron-containing compound may be 0.05 parts by weight to 1 parts by weight, and more specifically, 0.1 parts by weight to 0.8 parts by weight with respect to 100 parts by weight of the positive electrode active material.

In addition, the dry mixing method may be performed by using mixing methods such as a mortar grinder mixing method using a mortar; or a mechanical mill such as a roll-mill, ball-mill, high energy ball mill, planetary mill, stirred ball mill, vibrating mill or jet-mill, and in consideration of formation of the uniform surface treatment layer, the dry mixing method may be more specifically performed using a mechanical mill.

The thermal treatment may be performed in the proximity of the melting point of the boron-containing compound. For example, the melting point of the boron-containing compound may be 130° C. to 500° C. When the boron-containing compound is thermally treated in the above-mentioned temperature range, the boron-containing compound is melted and flows to be reacted with at least some of lithium impurities present on the lithium composite metal oxide, thereby easily converting the boron-containing compound into boron lithium oxide and coating the surface of the lithium metal oxide. As described above, the lithium impurities present on the lithium composite metal oxide may be reduced by the conversion into the boron lithium oxide. In addition, a surface treatment layer may also be formed by uniformly coating the surface of the lithium composite metal oxide with the boron lithium oxide at an amount proportional to the amount of the boron-containing compound even at a low temperature for thermal treatment.

More specifically, the thermal treatment of the boron-containing compound may be performed at 130° C. to 500° C., further more specifically 130° C. to 500° C. for 3 hours to 10 hours. When the temperature for the thermal treatment is less than 130° C., the boron-containing compound is not sufficiently melted, the boron-containing compound may still remain on the lithium composite metal oxide, or even when converted into the boron lithium oxide, a uniform surface treatment layer may be formed, and when the temperature for the thermal treatment is more than 500° C., a reaction is made very fast because of the high temperature, and therefore, a uniform surface treatment layer may not be formed on the surface of the lithium composite metal oxide.

In addition, when the surface treatment layer includes aluminum, a surface treatment layer may be formed on the surface of the positive electrode active material by mixing the prepared positive electrode active material with an aluminum-containing raw material and then thermally treating the resulting mixture. Here, the aluminum-containing raw material may be $Al_2O_3$, uniformly coated in the formation of the surface treatment layer, and formed in a single particle even at a low temperature. In addition, after the surface treatment layer is formed, the aluminum-containing raw material may have an average particle size of 100 nm or less, more specifically 50 nm to 80 nm to inhibit a change in crystal structure of the formed metal oxide.

The thermal treatment of the aluminum-containing compound may be performed at 300° C. to 500° C. When the temperature for the thermal treatment is less than 300° C., the coated oxide in a size of 100 nm or less is not even crystallized, and when the active material is applied to a battery, migration of lithium ions may be disturbed. In addition, when the temperature for the thermal treatment is higher, lithium evaporation and a crystallization degree of the metal oxide layer formed on the surface of the active material are increased, there may be a problem in Li+ migration. In addition, when the time for thermal treatment is excessively long, lithium evaporation and a crystallization degree of the metal oxide layer formed on the surface of the active material are increased, there may be a problem in Li+ migration.

Meanwhile, when the wet method is used, a surface treatment layer may be formed by preparing a composition for forming a surface treatment layer by dissolving or dispersing the coating element-containing raw material for forming a surface treatment layer in a solvent, treating the surface of a positive electrode active material by a conventional slurry coating method, specifically, coating, spraying or dipping, and then drying the resulting surface.

Here, the coating element-containing raw material is the same as defined above, and the solvent may be suitably selected according to the type of a raw material and is any one that can dissolve or uniformly disperse the raw material without particular limitation.

The process of forming a surface treatment layer may be performed once, or twice or more to form a surface treatment layer on the surface of the positive electrode active material to have a multilayer structure including two or more layers. Specifically, after primary surface treatment using a boron-containing raw material for the positive electrode active material, secondary surface treatment may be performed using an aluminum-containing raw material for the positive electrode material formed on the first surface treatment layer.

As the positive electrode active material prepared according to the above-described preparation method includes the buffer layer, which includes a pore between the core and the shell by controlling the pH, concentration and rate of a reactant, decomposition of the active material during rolling in the manufacture of an electrode may be minimized, and reactivity with an electrolyte solution may be maximized, and since the particles forming the shell have a crystal structure with orientation to facilitate intercalation and deintercalation of lithium ions, the resistance of a secondary battery may be reduced, and the lifespan characteristic thereof may be improved. In addition, the positive electrode active material may be controlled in specific surface area and average particle diameter, thereby further improving a battery capacity characteristic, and as distribution of a transition metal is further controlled throughout the entire active material particles, when applied to a battery, high capacity, a high lifespan, and thermal stability may be simultaneously exhibited, and performance deterioration at a high voltage may be minimized.

Therefore, according to still another embodiment of the present invention, a positive electrode and a lithium secondary battery, which include the positive electrode active material, are provided.

Specifically, the positive electrode includes a positive electrode collector and a positive electrode active material layer, which is formed on the positive electrode collector and includes the above-described positive electrode active material.

The positive electrode collector is not particularly limited as long as it does not cause a chemical change in a battery and has conductivity, and may be, for example, stainless steel, aluminum, nickel, titanium, calcined carbon, or aluminum or stainless steel whose surface is treated with carbon, nickel, titanium or silver. In addition, the positive electrode collector may conventionally have a thickness of 3 μm to 500 μm, and an adhesive strength of the positive electrode active material may be increased by imparting fine unevenness on the surface of the collector. For example, the positive electrode collector may be used in various forms such as a film, a sheet, a foil, a net, a porous body, a foaming body, and a non-woven fabric body.

In addition, the positive electrode active material layer may include a conductor and a binder, along with the positive electrode active material described above.

Here, the conductor is used to impart conductivity to an electrode, and may be any one that does not cause a chemical change and has electronic conductivity in the battery without any particular limitation. As a specific example, the conductor may be a graphite such as natural or artificial graphite; a carbon-based material such as carbon black, acetylene black, ketjen black, channel black, furnace black, lamp black, thermal black, or carbon fiber; a metal powder or metal fiber formed of copper, nickel, aluminum or silver; a conductive whiskey such as zinc oxide or potassium titanate; a conductive metal oxide such as titanium oxide; or a conductive polymer such as a polyphenylene derivative, and may be used alone or in combination of two or more thereof. The conductor may conventionally include 1 wt % to 30 wt % with respect to the total weight of a positive electrode active material layer.

In addition, the binder serves to improve attachment between the positive electrode active material particles, and the adhesive strength of the positive electrode active material to the collector. As a specific example, the binder may be polyvinylidenefluoride (PVDF), polyvinylidenefluoride-hexafluoropropylene copolymer (PVDF-co-HFP), polyvinylalcohol, polyacrylonitrile, carboxylmethylcellulose (CMC), starch, hydroxypropylcellulose, regenerated cellulose, polyvinylpyrrolidone, tetrafluoroethylene, polyethylene, polypropylene, ethylene-propylene-diene monomer (EPDM), sulfonated-EPDM, styrene butadiene rubber (SBR), fluoro rubber, or various copolymers thereof, and may be used alone or in combination two or more thereof. The binder may be included at 1 wt % to 30 wt % with respect to a total weight of the positive electrode active material layer.

The positive electrode may be manufactured by a conventional method of manufacturing a positive electrode, except that the above-described positive electrode active material is used. Specifically, a positive electrode collector may be coated with a composition for forming a positive electrode active material layer, which includes the positive electrode active material, and selectively, a binder and a conductor, dried and rolled, thereby manufacturing the positive electrode. Here, the types and contents of the positive electrode active material, the binder, and the conductor are the same as described above.

The solvent may be a solvent generally used in the conventional art, for example, dimethyl sulfoxide (DMSO), isopropyl alcohol, N-methylpyrrolidone (NMP), acetone or water, and may be used alone or in combination of two or more thereof. An amount of the solvent is an amount sufficient to dissolve or disperse the positive electrode active material, the conductor and the binder in consideration of a thickness of a coated slurry and a manufacturing yield, and to exhibit viscosity such that excellent thickness uniformity may be exhibited when coated to manufacture the positive electrode.

In still another method, the positive electrode may be manufactured by casting the composition for a positive electrode active material layer on a separate support, and laminating a film peeled from the support on the positive electrode collector.

According to yet another exemplary embodiment of the present invention, an electrochemical device including the positive electrode is provided. The electrochemical device may be, specifically, a battery or capacitor, and more specifically, a lithium secondary battery.

The lithium secondary battery specifically includes a positive electrode, a negative electrode located opposite to the positive electrode, a separator interposed between the positive electrode and the negative electrode and an electrolyte, and the positive electrode is the same as described above. In addition, the lithium secondary battery may selectively further include a battery case accommodating an electrode assembly of the positive electrode, the negative electrode and the separator, and a sealing member sealing the battery case.

In the lithium secondary battery, the negative electrode includes a negative electrode collector and a negative electrode active material layer located on the negative electrode collector.

The negative electrode collector is not particularly limited as long as it does not cause a chemical change and has electronic conductivity in the battery, and may be, for example, copper, stainless steel, aluminum, nickel, titanium, calcined carbon, copper or stainless steel whose surface is treated with carbon, nickel, titanium or silver, or an aluminum-cadmium alloy. In addition, the negative electrode collector may conventionally have a thickness of 3 μm to 500 μm, and an adhesive strength of the negative electrode active material may be reinforced by imparting fine unevenness to the surface of the collector like the positive electrode collector. For example, the negative electrode collector may be used in various forms such as a film, a sheet, a foil, a net, a porous body, a foaming body, and a non-woven fabric body.

The negative electrode active material layer selectively includes a binder and a conductor, in addition to a negative electrode active material. The negative electrode active material layer may be manufactured by, for example, stainless steel, aluminum, nickel, titanium.

As the negative electrode active material, a reversible intercalation and deintercalation-available compound of lithium may be used. As a specific example, the negative electrode active material may be a carbon-based material such as artificial graphite, natural graphite, graphitized carbon fiber, or amorphous carbon; a metallic compound which is able to form an alloy with lithium, such as Si, Al, Sn, Pb, Zn, Bi, In, Mg, Ga, Cd, a Si alloy, an Sn alloy or an Al alloy; a metal oxide for doping/dedoping lithium, such as $SiO_x$ ($0<x<2$), $SnO_2$, a vanadium oxide, or a lithium vanadium oxide; or a complex including the metallic compound and a carbon material, such as a Si—C complex or Sn—C complex, and may be used alone or in combination of two or more thereof. In addition, as the negative electrode active material, a metal lithium thin film may be used. In addition, the carbon material may be any one of low crystalline carbon and high crystalline carbon. As a representative example, the low crystalline carbon is soft carbon or hard carbon, and the high crystalline carbon is high temperature calcined carbon, for example, amorphous, platy, flaky, spherical or fiber-shaped natural or artificial graphite, Kish graphite, pyrolytic carbon, mesophase pitch based carbon fiber, meso-carbon microbeads, mesophase pitches and petroleum or coal tar pitch derived cokes.

In addition, the binder and the conductor may be the same as described in the positive electrode.

Meanwhile, in the lithium secondary battery, a separator divides a negative electrode and a positive electrode, provides a migration path of lithium ions, and can use any one used in conventional lithium secondary batteries as a separator without particular limitation. Particularly, one that has a low resistance with respect to the ion migration of an electrolyte, and excellent moisture retainability of an electrolyte solution. Specifically, a porous polymer film, for example, a porous polymer film manufactured of a polyolefin-based polymer such as an ethylene homopolymer, a propylene homopolymer, an ethylene/butene copolymer, an ethylene/hexene copolymer or an ethylene/metacrylate copolymer, or a laminate structure having two or more layers thereof, may be used. In addition, as a separator, a conventional porous non-woven fabric body, for example, glass fiber with a high melting point or polyethyleneterephthalate fiber, may be used. In addition, to ensure thermal resistance or mechanical strength, a coated separator including a ceramic component or a polymer material may be used, or may be selectively formed in a single- or multi-layer structure.

In addition, as an electrolyte used in the present invention, an organic liquid electrolyte, an inorganic liquid electrolyte, a solid polymer electrolyte, a gel-like polymer electrolyte, a solid inorganic electrolyte, or a melt inorganic electrolyte, which can be used in manufacture of a lithium secondary battery, may be used, but the present invention is not limited thereto.

Specifically, the electrolyte may include an organic solvent and a lithium salt.

The organic solvent may be any one that can serve as a medium in which ions involved in an electrochemical reaction of a battery are migrated without particular limitation. Specifically, the organic solvent may be an ester-based solvent such as methyl acetate, ethyl acetate, γ-butyrolactone or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethylcarbonate (DMC), diethylcarbonate (DEC), methylethylcarbonate (MEC), ethylmethylcarbonate (EMC), ethylene carbonate (EC), or propylene carbonate (PC); an alcohol-based solvent such as ethylalcohol, isopropyl alcohol; a nitrile such as R—CN (R is a linear, branched or cyclic C2-C20 hydrocarbon group, and may include a double bond, an aromatic ring or an ether bond); an amide such as dimethylformamide; a dioxolane such as 1,3-dioxolane; or a sulfolane. Among these, the organic solvent is preferably a carbonate-based solvent, and more preferably, a mixture of a cyclic carbonate (e.g., ethylene carbonate or propylene carbonate) having a high ion conductivity and a high permittivity to improve charge/discharge performance of a battery, and a low viscosity linear carbonate-based compound (e.g., ethylmethyl carbonate, dimethyl carbonate or diethyl carbonate). In this case, a cyclic carbonate and a chain carbonate may be mixed at a volume ratio of approximately 1:1 to 1:9, resulting in excellent performance of the electrolyte solution.

The lithium salt may be any compound capable of providing lithium ions used in a lithium secondary battery without particular limitation. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. A concentration of the lithium salt may be in a range of 0.1 to 2.0M. When the concentration of the lithium salt is in the above range, the electrolyte may have suitable conductivity and viscosity, excellent electrolyte performance may be exhibited, and lithium ions may be effectively migrated.

Other than the components of the electrolyte, to improve the lifespan characteristic of a battery, inhibit a decrease in battery capacity, and improve discharge capacity of a battery, the electrolyte may further include, for example, one or more additives selected from a haloalkylene carbonate-based compound such as difluoroethylenecarbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, ammonium salt, pyrrole, 2-methoxy ethanol, and aluminum trichloride. Here, the additive may include 0.1 to 5 wt % with respect to the total weight of the electrolyte.

Since a lithium secondary battery including the positive electrode active material according to the present invention stably exhibit excellent discharge capacity, output characteristic and capacity retention, the lithium secondary battery is useful for portable devices such as mobile phones, notebook computers, digital cameras, etc., and an electric automobile field for a hybrid electric vehicle (HEV).

Therefore, according to another exemplary embodiment of the present invention, a battery module including the lithium secondary battery as a unit cell, and a battery pack including the same pare provided.

The battery module or battery pack may be used as a power source for any one or more medium-and-large sized devices of power tools; electric cars such as an electric vehicle (EV), a hybrid electric vehicle, and a plug-in Hybrid Electric Vehicle (PHEV); and systems for storing electric power.

EXAMPLES

Hereinafter, examples of the present invention will be described in detail to be easily implemented by those of ordinary skill in the art. However, the present invention may be embodied various forms and is not limited to those described herein.

Example 1: Preparation of Positive Electrode Active Material

In a 5 L batch-type reactor set at 60° C., a 2M mixed solution of first metal raw materials was prepared by mixing nickel sulfate, cobalt sulfate and manganese sulfate in water at a molar ratio of 80:10:10. Separately, a 2M mixed solution of second metal raw materials was prepared by mixing nickel sulfate, cobalt sulfate and manganese sulfate in water at a molar ratio of 40:30:30. A container with the mixed solution of the first metal raw materials was connected to be added into the reactor, and a container with the mixed solution of the second metal raw materials was connected to be added into the container with the mixed solution of the first metal raw materials. In addition, a 4M NaOH solution and a 7% $NH_4OH$ aqueous solution were prepared and then each connected to the reactor.

3 L of deionized water was added to a coprecipitation reactor (capacity: 5 L), and purged with nitrogen gas in the reactor at a rate of 2 L/min to remove dissolved oxygen in water, thereby creating a non-oxidative atmosphere in the reactor. Afterward, 100 ml of 4M NaOH was added, and then stirred at 1200 rpm at 60° C. to adjust the pH level to pH 12.0.

Subsequently, a hydroxide seed of the mixed solution of the first metal raw materials was formed by adding the mixed solution of the first metal raw materials, an NaOH aqueous solution and an $NH_4OH$ aqueous solution at 180 ml/hr, 180 ml/hr, and 10 ml/hr, respectively, and reacting them at pH 12 for 30 minutes. Afterwards, amounts of NaOH and $NH_4OH$ were gradually reduced, the pH was reduced at a rate of pH 2/hr until reaching pH 10, the mixed solution of second metal raw materials was transferred to the container with the mixed solution of the first metal raw materials at 150 ml/hr to induce the growth of hydroxide particles and a concentration gradient created in the particles. The reaction was maintained for 36 hours to grow metal-containing hydroxide particles. The resulting metal-containing hydroxide particles were separated, washed, and dried in an oven at 120° C.

The prepared metal-containing hydroxide particles were mixed with lithium hydroxide as a lithium raw material and tungsten oxide at a molar ratio of 1:1.07:0.2, and thermally treated for 10 hours at 300° C., 10 hours at 500° C., and 10 hours at 820° C. Accordingly, crystals formed inside at a high pH were shrunken and crystals formed at a low pH were grown, thereby forming a core and a shell, a pore is formed between the core and the shell, and a three-dimensional network structure is created in the crystals located between the core and the shell, resulting in a positive electrode active material including the core, the shell and a buffer layer.

Example 2: Preparation of Positive Electrode Active Material

A surface treatment layer was formed by mixing 1 wt % of 100 nm alumina ($Al_2O_3$) particles with respect to the positive electrode active material prepared in Example 1, and thermally treating the resulting mixture for 5 hours at 400° C. in the atmosphere.

Example 3: Preparation of Positive Electrode Active Material

A surface treatment layer was formed by mixing 0.1 wt % of boric acid (Samchun Chemical Co., Ltd.) with respect to the positive electrode active material prepared in Example 1, and thermally treating the resulting mixture for 5 hours at 400° C. in the atmosphere.

Comparative Example 1: Preparation of Positive Electrode Active Material

In a 5 L batch-type reactor set at 60° C., a 2M metal salt solution was prepared by mixing nickel sulfate, cobalt sulfate and manganese sulfate in water at a molar ratio of 60:20:20. A container with the metal salt is connected to be added into the reactor, and a 4M NaOH solution and a 7% $NH_4OH$ aqueous solution were prepared and each connected to the reactor.

3 L of deionized water was added to a coprecipitation reactor (capacity: 5 L) and purged with nitrogen gas in the reactor at a rate of 2 L/min to remove dissolved oxygen in water and create a non-oxidative atmosphere in the reactor. Afterward, 100 ml of 4M NaOH was added, and the resulting mixture was stirred at 1200 rpm at 60° C. to adjust the pH level to pH 12.0.

Hereinafter, nickel-manganese-cobalt-based composite metal hydroxide particles were formed by adding the metal salt solution, an NaOH aqueous solution, and an $NH_4OH$ aqueous solution at 180 ml/hr, 180 ml/hr and 10 ml/hr, respectively, to allow a reaction for 36 hours.

The resulting nickel-manganese-cobalt-based composite metal hydroxide particles were mixed with lithium hydroxide as a lithium raw material at a molar ratio of 1:1.07, and thermally treated in an oxygen atmosphere (oxygen partial pressure: 20%) at 820° C. for 10 hours, thereby preparing a positive electrode active material.

Preparation Example: Preparation of Lithium Secondary Battery

Lithium secondary batteries were prepared using the positive electrode active materials prepared in Example 1 and Comparative Example 1, respectively.

In detail, a composition for forming a positive electrode (viscosity: 5000 mPa·s) was prepared by mixing each of the positive electrode active materials prepared in Example 1 and Comparative Example 1, a carbon black conductor and a PVdF binder in an N-methylpyrrolidone solvent at a weight ratio of 95:2.5:2.5, and an aluminum collector was coated with the composition, dried at 130° C. and rolled, thereby manufacturing a positive electrode.

In addition, a composition for forming a negative electrode was prepared by mixing a natural graphite as a negative electrode active material, a carbon black conductor and a PVdF binder in a N-methylpyrrolidone solvent at a weight ratio of 85:10:5, and then was applied to a copper collector, thereby manufacturing a negative electrode.

A lithium secondary battery was manufactured by forming an electrode assembly by interposing a porous polyethylene separator between the positive electrode and the negative electrode, which were previously manufactured, placing the electrode assembly in a case, and injecting an electrolyte solution into the case. Here, the electrolyte solution was prepared by dissolving 1.0M lithium hexafluorophosphate ($LiPF_6$) in an organic solvent consisting of ethylene carbonate/dimethyl carbonate/ethylmethyl carbonate (mixing volume ratio of EC/DMC/EMC=3/4/3).

Experimental Example 1: Structural Observation of Positive Electrode Active Material The precursor manufactured in Example 1 was observed by field emission scanning electron microscopy (FE-SEM) to calculate diameters and volumes of the core and the shell, and the ratio in the active material from the result. The result is shown in Table 1.

TABLE 1

|       | Diameter (μm) | Volume (μm³) | Ratio (%) |
|-------|---------------|--------------|-----------|
| Core  | 4.6           | 51           | 11        |
| Shell | 5.1           | 427          | 89        |
| Total | 9.7           | 478          | 100       |

The positive electrode active material prepared in Example 1 was processed using ion milling, and the cross-sectional structure of the positive electrode active material was observed using FE-SEM. The results are shown in FIG. 2.

From the result of observing a cross-sectional structure, it was confirmed that the buffer layer including the three-dimensional network structure was formed in the core and shell parts, and the particles in the shell had crystal orientation from the particle center to the surface. In addition, the total particle diameter of the positive electrode active material was 9.9 μm, when the radius of the positive electrode active material was 4.95 μm, the thickness (radius) of the core part 1 was 1.4 μm, the thickness of the buffer layer was 1.7 μm, and the thickness of the shell 2 was 1.85 μm. As the result of calculating a porosity by converting a volume ratio from the above results, the porosity in the positive electrode active material was approximately 22 vol %.

Experimental Example 2: Analysis of Concentration Gradient in Positive Electrode Active Material In addition, component analysis for the positive electrode active material in Example 1 was performed using EPMA. The results are shown in Table 2. In the following table, scan positions were allotted from scan 1 to scan 5 in order, which are shown in FIG. 2.

TABLE 2

|              | Scan | Ni (mol %) | Co (mol %) | Mn (mol %) |
|--------------|------|------------|------------|------------|
| Core         | 01   | 67         | 18         | 16         |
| Buffer layer | 02   | 65         | 19         | 17         |
| Shell        | 03   | 61         | 20         | 19         |
|              | 04   | 59         | 20         | 20         |
|              | 05   | 58         | 22         | 22         |
| Total        |      | 60         | 20         | 20         |

As shown in Table 2, it can be confirmed that a concentration gradient was created such that the concentration of Ni was reduced, and the concentrations of cobalt and manganese were increased in a direction from the center to the surface of the positive electrode active material.

Experimental Example 3: Analysis of Positive Electrode Active Material

Average particle diameters, specific surface areas and rolling densities for the positive electrode active materials prepared in Examples 1 to 3, and Comparative Example 1 were measured, and the results are shown in Table 3.

(1) Average particle diameter ($D_{50}$): The positive electrode active material may be introduced into a laser diffraction particle size analysis instrument (e.g., Microtrac MT 3000), and sonicated at approximately 28 kHz (60 W), thereby calculating the average particle diameter ($D_{50}$) using the instrument, based on 50% particle diameter distribution.

(2) BET specific surface area: The specific surface area of the positive electrode active material may be measured by the BET method, and specifically, the adsorption amount of nitrogen gas may be calculated using BELSORP-mini II (BEL Japan) at a liquid nitrogen temperature (77K).

(3) Tap density: The tap density was measured using a tap density tester.

(4) Ni disorder and average particle size of crystal particles were measured using an X-ray Diffraction (XRD) analyzer.

TABLE 3

|  | Example 1 | Example 2 | Example 3 | Comparative Example 1 |
|---|---|---|---|---|
| Average particle diameter ($D_{50}$) (μm) | 9.9 | 9.8 | 9.8 | 10 |
| BET specific surface area ($m^2/g$) | 0.31 | 0.32 | 0.27 | 0.25 |
| Porosity (%) | 22 | 22 | 22 | 0 |
| Ni disorder (%) | 1.0 | 1.1 | 1.0 | 3.5 |
| Average particle size of crystal particles (nm) | 110 | 105 | 110 | 250 |

The positive electrode active materials of Examples 1 to 3 according to the present invention had the same level of average particle diameter as that of Comparative Example 1 due to its specific structure, and exhibited more increased BET specific surface area and porosity. However, in the case of the positive electrode active material of Example 3 forming a boron-containing surface treatment layer, the boron component uniformly forms a protective layer on the surface of the active material to mitigate surface curvature, and therefore, the BET specific surface area value was numerically a little lower than those of Examples 1 and 2. In addition, the positive electrode active materials of Examples 1 to 3 according to the present invention exhibited lower Ni disorders and crystal particle sizes than Comparative Example 1.

Experimental Example 4: Evaluation of Positive Electrode Active Material

Coin cells (using a negative electrode of a Li metal) manufactured using each of the positive electrode active materials prepared in Examples 1 to 3, and Comparative Example 1 were charged at a constant current (CC) of 0.1 C to a voltage of 4.25 V at 25 □, and charge at the first cycle was then performed by charging the batteries at a constant voltage (CV) of 4.25 V to a charge current of 0.05 mAh. After the lithium secondary batteries were left standing for 20 minutes, the batteries were discharged at constant currents of 0.1 C to a voltage of 3.0 V to measure discharge capacity at the first cycle.

Afterward, by changing the discharge condition into 2 C, charge/discharge capacity, charge/discharge efficiency and rate capability were evaluated. The results are shown in Table 4.

TABLE 4

|  | First charge/discharge | | | 2 C rate | |
|---|---|---|---|---|---|
|  | Charge capacity (mAh/g) | Discharge capacity (mAh/g) | Charge/ discharge efficiency (%) | Capacity (mAh/g) | 2.0 C/ 0.1 C (%) |
| Example 1 | 194.0 | 177.5 | 91.5 | 160.5 | 90.4 |
| Example 2 | 193.4 | 177.0 | 91.5 | 159.1 | 89.9 |
| Example 3 | 195.1 | 178.9 | 91.7 | 161.6 | 90.3 |
| Comparative Example 1 | 192.5 | 173.8 | 90.3 | 154.9 | 89.1 |

From the experimental results, a lithium secondary battery including each of the positive electrode active materials of Examples 1 to 3 is improved in all of charge/discharge efficiency, rate capability and a capacity characteristic, compared to that including the positive electrode active material of Comparative Example 1.

Experimental Example 5: Evaluation of Battery Characteristics of Lithium Secondary Battery Battery characteristics of the lithium secondary battery including each of the positive electrode active materials of Examples 1 to 3, and Comparative Example 1 were evaluated by the following method.

In detail, 800 cycles of charge/discharge were performed on the lithium secondary battery at 25° C. in a driving voltage range from 2.8V to 4.15V under the condition of 1 C/2 C.

In addition, to evaluate an output characteristic, after the battery charged/discharged at room temperature (25° C.) was charged based on SOC 50%, a resistance was measured, and a depth of voltage drop when applying a current was measured based on SOC 50% at a low temperature (−30° C.).

As a result, resistances at room temperature (25° C.) and a low temperature (−30° C.), and cycle capacity retention, which is a ratio of the discharge capacity at the $800^{th}$ cycle with respect to the initial capacity after 800 cycles of charging/discharging at room temperature, were measured, and the results are shown in Table 5.

TABLE 5

|  | Resistance at room temperature (25° C.) (mohm) | Resistance at low temperature (−30° C.) (ΔV) | $800^{th}$ Cycle capacity retention (%) at room temperature (25° C.) |
|---|---|---|---|
| Example 1 | 1.34 | 1.45 | 95.0 |
| Example 2 | 1.30 | 1.49 | 96.5 |
| Example 3 | 1.25 | 1.40 | 96.7 |

TABLE 5-continued

| | Resistance at room temperature (25° C.) (mohm) | Resistance at low temperature (−30° C.) (ΔV) | 800$^{th}$ Cycle capacity retention (%) at room temperature (25° C.) |
|---|---|---|---|
| Comparative Example 1 | 1.58 | 1.77 | 88.5 |

From the experimental results, it can be confirmed that the lithium secondary batteries using the positive electrode active materials prepared in Examples 1 to 3 are excellent all in output characteristics at room temperature and low temperature, and cycle characteristic, compared to Comparative Example 1.

The invention claimed is:

1. A positive electrode active material for a secondary battery, comprising:
   a core;
   a shell located to surround the core; and
   a buffer layer located between the core and the shell, and including a three-dimensional network structure connecting the core and the shell and a pore,
   wherein the core, the shell and the three-dimensional network structure in the buffer layer each independently include a lithium composite metal oxide, and
   the positive electrode active material has a BET specific surface area of 0.2 m$^2$/g to 0.5 m$^2$/g, a porosity of 30 vol % or less, and an average particle size ($D_{50}$) of 8 μm to 15 μm.

2. The positive electrode active material of claim 1, wherein the lithium composite metal oxide includes a compound of Formula 1 below:

$Li_aNi_{1-x-y}Co_xM1_yM3_zM2_wO_2$     [Formula 1]

(In Formula 1, M1 is at least any one selected from the group consisting of Al and Mn, M2 is any one or two or more elements selected from the group consisting of Zr, Ti, Mg, Ta and Nb, and M3 is any one or two or more elements selected from the group consisting of W, Mo and Cr, 1.0≤a≤1.5, 0<x≤0.5, 0<y≤0.5, 0.0005≤z≤0.03, 0≤w≤0.02, and 0<x+y≤0.7).

3. The positive electrode active material of claim 2, wherein at least any one metal element of the nickel, M1 and cobalt shows a continuously changed concentration gradient in any one region of the core, the shell and the entire active material particles.

4. The positive electrode active material of claim 2, wherein a content of the nickel included in the core is greater than that in the shell.

5. The positive electrode active material of claim 2, wherein a content of the cobalt included in the core is less than that in the shell.

6. The positive electrode active material of claim 2, wherein a content of the M1 included in the core is less than that in the shell.

7. The positive electrode active material of claim 2, wherein the nickel, cobalt and M1 each independently show a continuously changed concentration gradient in the entire active material particles,
   a concentration of the nickel is reduced with a continuous concentration gradient in a direction from the center to the surface of the active material particle, and
   concentrations of the cobalt and M1 are each independently increased with a continuous concentration gradient in a direction from the center to the surface of the active material particle.

8. The positive electrode active material of claim 2, wherein the M1 is manganese (Mn).

9. The positive electrode active material of claim 1, wherein the positive electrode active material is formed in secondary crystal particles formed by agglomerating two or more primary crystal particles, and includes a polycrystalline lithium composite metal oxide having an average crystal particle size of 60 nm to 200 nm.

10. The positive electrode active material of claim 2, wherein the positive electrode active material includes a lithium composite metal oxide having a nickel disorder of 0.2% to 3.0% in the crystal.

11. The positive electrode active material of claim 1, wherein the core is secondary particles formed by agglomerating the primary particles.

12. The positive electrode active material of claim 1, wherein the shell includes lithium composite metal oxide particles having crystal orientation in which particles are radially grown in a direction from the center to the surface of the positive electrode active material.

13. The positive electrode active material of claim 1, wherein the shell has a shell area of 0.2 to less than 1, determined by Equation 1 below:

Shell area=(the radius of the positive electrode active material−the core radius−the thickness of the buffer layer)/the radius of positive electrode active material.     [Equation 1]

14. The positive electrode active material of claim 1, wherein a ratio of the core radius with respect to the radius of the positive electrode active material is more than 0 and less than 0.4, and a ratio of a length from the center of the positive electrode active material particle to the interface between the buffer layer and the shell with respect to the radius of the positive electrode active material particle is more than 0 and less than 0.7.

15. The positive electrode active material of claim 1, wherein the positive electrode active material further comprises:
   one or more surface treatment layers including any one or two or more coating elements selected from the group consisting of boron (B), aluminum (Al), titanium (Ti), silicon (Si), tin (Sn), magnesium (Mg), iron (Fe), bismuth (Bi), antimony (Sb) and zirconium (Zr) on the surface of the positive electrode active material particle.

16. A method of preparing a positive electrode active material for a secondary battery of claim 1, comprising:
   preparing a reaction solution in which a seed of a metal-containing hydroxide or oxyhydroxide is generated by mixing an ammonium cation-containing complexing agent and a basic compound with a metal raw material mixture including a nickel raw material, a cobalt raw material and an M1 raw material (here, M1 is at least any one element selected from the group consisting of Al and Mn) to induce coprecipitation at pH 11 to 13;
   growing the metal-containing hydroxide or oxyhydroxide particles by adding an ammonium cation-containing complexing agent and a basic compound to the reaction solution until the reaction solution reaches pH 8 to less than 11; and
   mixing the grown metal-containing hydroxide or oxyhydroxide particles with a lithium raw material and an M3 raw material (here, M3 is one or two or more elements selected from the group consisting of W, Mo and Cr) and then thermally treating the resulting mixture.

17. The method of claim 16, wherein the growing of the metal-containing hydroxide or oxyhydroxide particles comprises adding a second metal raw material mixture including a nickel raw material, a cobalt raw material and an M1-containing raw material at different concentrations from those for the first metal raw material mixture to a first metal raw material mixture including a nickel raw material, a cobalt raw material and an M1-containing raw material to gradually change a mixing ratio from 100 vol %:0 vol % to 0 vol %:100 vol %.

18. The method of claim 16, wherein the method further comprises:

Forming a surface treatment layer including any one or two or more coating elements selected from the group consisting of boron (B), aluminum (Al), titanium (Ti), silicon (Si), tin (Sn), magnesium (Mg), iron (Fe), bismuth (Bi), antimony (Sb) and zirconium (Zr) with respect to the positive electrode active material prepared after the thermal treatment process.

19. A positive electrode for a secondary battery, comprising:

the positive electrode active material according to claim 1.

20. A lithium secondary battery comprising the positive electrode of claim 19.

* * * * *